(12) United States Patent
Claessen (10) Patent No.: US 9,250,144 B2
(45) Date of Patent: Feb. 2, 2016

(54) DUAL CAPACITOR LOAD CELL

(71) Applicant: Albertus Maria Geradus Claessen, Oakwood, GA (US)

(72) Inventor: Albertus Maria Geradus Claessen, Oakwood, GA (US)

(73) Assignee: NCR CORPORATION, Duluth, GA (US)

( * ) Notice: Subject to any disclaimer, the term of this patent is extended or adjusted under 35 U.S.C. 154(b) by 209 days.

(21) Appl. No.: 13/950,003

(22) Filed: Jul. 24, 2013

(65) Prior Publication Data

US 2015/0027790 A1    Jan. 29, 2015

(51) Int. Cl.
*G01L 1/14* (2006.01)
*G01G 3/00* (2006.01)
*G01G 21/00* (2006.01)

(52) U.S. Cl.
CPC *G01L 1/142* (2013.01); *G01G 3/00* (2013.01); *G01G 21/00* (2013.01)

(58) Field of Classification Search
CPC . G01L 1/142; G01L 1/146; G01G 3/00–3/10; G01G 7/06; G01G 21/00
USPC ...................................................... 177/210 C
See application file for complete search history.

(56) References Cited

U.S. PATENT DOCUMENTS

| 2,614,416 | A | * | 10/1952 | Hollmann | 73/862.68 |
|---|---|---|---|---|---|
| 4,237,989 | A | * | 12/1980 | Lewis | 177/210 C |
| 4,273,204 | A | * | 6/1981 | Gillen | 177/210 C |
| 4,294,321 | A | * | 10/1981 | Wittlinger et al. | 177/210 FP |
| 4,381,826 | A | * | 5/1983 | Kupper | 177/211 |
| 4,548,086 | A | * | 10/1985 | Kastel | 73/862.632 |
| 4,750,082 | A | * | 6/1988 | Gerety | 361/283.1 |
| 4,856,603 | A | * | 8/1989 | Murakoso et al. | 177/210 C |
| 5,078,220 | A | * | 1/1992 | Briefer | 177/210 C |
| 5,388,460 | A | * | 2/1995 | Sakurai et al. | 73/514.32 |
| 5,672,850 | A | * | 9/1997 | Liu | 177/210 C |
| 5,786,549 | A | * | 7/1998 | Serizawa | 177/211 |
| 6,104,100 | A | | 8/2000 | Neuman | |
| 6,649,848 | B2 | * | 11/2003 | Kriger | 177/25.13 |
| 7,091,427 | B2 | * | 8/2006 | Luque et al. | 177/210 FP |

FOREIGN PATENT DOCUMENTS

GB    2330911 A  *  5/1999    ............... G01G 7/06

* cited by examiner

*Primary Examiner* — Randy W Gibson
(74) *Attorney, Agent, or Firm* — Schwegman, Lundberg & Woessner (57) ABSTRACT

A dual capacitor load cell is presented that includes two coupled capacitors with a common plate between them where the common plate is responsive to a force applied to the load cell. The capacitance of the two capacitors varies inversely and changes in response to the applied force. The combined capacitance of each capacitor is used to determine the magnitude of the force being applied to the load cell.

9 Claims, 8 Drawing Sheets

DUAL CAPACITOR LOAD CELL

FIELD OF THE INVENTION

The present invention relates to load cells that use capacitive technology to measure applied loads and more specifically to load cells that use two coupled capacitors to measure loads applied to the load cell.

BACKGROUND

A load cell is a sensor that converts a force applied to the load cell into an electric signal that represents the magnitude of the applied force. The electric signal may suitably be an analog or digital signal and may require additional processing to determine the weight producing the applied force. A load cell based on capacitive technology measures the applied load by detecting the change in the capacitance of a capacitor that is part of the load cell and undergoes a dimensional change as a result of the applied force. Capacitance is a measure of the amount of charge that can be stored in a capacitor. The capacitance of a parallel plate capacitor depends on the area of the two plates and the distance between the plates. In a load cell, one of the parallel plates moves in response to the applied force which changes the capacitance of the capacitor. Measuring the capacitance of the capacitor provides information about the force being applied to the load cell. However, the output is not linear and there are sensitivity issues.

SUMMARY

Among its several aspects, the present invention seeks to overcome or ameliorate at least one of the disadvantages of the prior art, or to provide a useful alternative.

Among its several aspects, the present invention recognizes that a single capacitor load cell can be improved by the addition of a second capacitor coupled to a first capacitor. Because the two capacitors are coupled, as discussed further below, their capacitance varies inversely based on the force being applied to the load cell. The invention recognizes that this configuration improves sensitivity and linearizes the output signal of the load cell as a function of the force applied.

In accordance with the teachings of the present invention, a dual capacitor load cell is provided for determining the value of a force applied to a load cell. The two coupled capacitors are parallel plate capacitors that have one plate in common. The common plate of the two capacitors is configured to deflect in response to the force being applied to the load cell. As the common plate deflects, the capacitance of one capacitor decreases while the capacitance of the other capacitor increases. Measuring and combining the two capacitance values results in a value that is used to determine the value of the force being applied to the load cell.

In accordance with the teachings of the present invention, a memory is provided that includes calibration data for the load cell used to determine the force being applied to the load cell. The calibration data can be read from or written to the memory as needed. If the load cell is recalibrated, updated calibration data is written to memory and replaces the old calibration data.

In accordance with an embodiment of the present invention, there is provided a capacitive based sensor for measuring a received force. The sensor comprises: a first support beam and a second support beam where the first and the second support beams are horizontally spaced apart and generally parallel; a top capacitive plate disposed horizontally across and attached to the first support beam and the second support beam; a force responsive deflectable plate including a vertically deflectable main portion attached to a first side portion and a second side portion, the first side portion attached to the first support beam, the second side portion attached to the second support beam, the main portion being resiliently connected to the first and the second support beams such that the main portion is configured to move vertically in response to the received force and where the force responsive deflectable plate is located below the top capacitive plate; a bottom capacitive plate disposed horizontally between and attached to the first support beam and the second support beam and located below the force responsive deflectable plate; and where the top capacitive plate and the force responsive deflectable plate form a first capacitor, and the bottom capacitive plate and the force responsive deflectable plate form a second capacitor, and the capacitance of the first capacitor and the second capacitor change inversely as the result of movement of the force responsive deflectable plate.

In accordance with an embodiment of the present invention, there is provided a method for operating a capacitive based sensor for measuring a received force. The method comprises: receiving the force to be measured wherein the force deflects a force responsive deflectable plate that moves in response to the received force between two fixed plates and wherein the force responsive deflectable plate forms a first capacitor and a second capacitor between the two fixed plates; measuring the capacitance of the first capacitor and the capacitance of the second capacitor while the received force is applied to the force responsive deflectable plate; and transmitting capacitance information related to the first and second capacitors.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
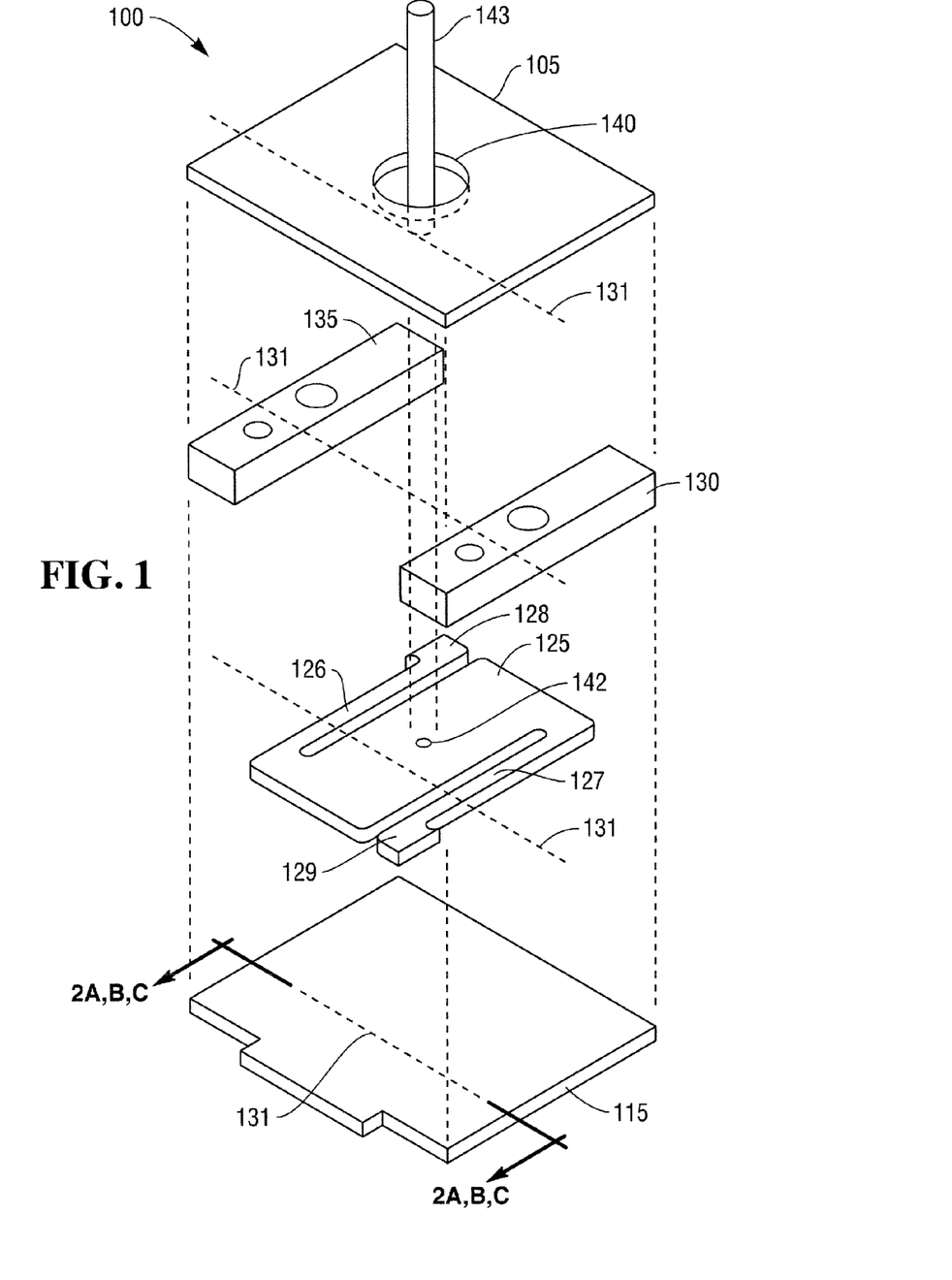
FIG. 1 is a high-level 3-dimensional drawing illustrating a load cell of the present invention that includes dual coupled capacitors.

With reference to FIG. 1, there is provided a high-level three dimensional drawing illustrating a load cell 100 of the present invention that includes dual coupled capacitors. The load cell 100 uses differential capacitive technology to measure a received force and then generates and transmits a digital signal representing the change in capacitance of two coupled capacitors as a result of the received force. The digital signal is used to determine a value for the weight that produced the force. The load cell 100 includes a first support beam 135 and a second support beam 130. The first and second support beams 135, 130 are spaced apart and the long axis of each of the beams are parallel or generally parallel to each other. In this embodiment, each of the support beams 135, 130 have the shape of a rectangular bar. The top surface of the first support beam 135 and the top surface of the second support beam 130 are in a top horizontal plane. The bottom surface of the first support beam 135 and the bottom surface of the second support beam 130 are in a bottom horizontal plane.

The load cell 100 further includes a bottom capacitive plate 115 where a portion of the left top side of the bottom capacitive plate 115 is attached to the bottom side of the first support beam 135. A portion of the right top side of the bottom capacitive plate 115 is attached to the bottom side of the second support beam 130. The bottom capacitive plate 115 is electrically isolated from the two support beams 135, 130. In this embodiment, the bottom capacitive plate 115 is a ridged printed circuit board that provides mechanical support to the load cell 100.

The load cell 100 additionally includes a force responsive deflectable plate 125 disposed between the first support beam 135 and the second support beam 130. In this embodiment, the force responsive deflectable plate 125 is metallic and generally in an "S" shape with the ends attached to the support beams 135, 130. In some embodiments, the first support beam 135, the second support beam 130 and the force responsive deflectable plate 125 are machined out of a single block of metal such as aluminum. The force responsive deflectable plate 125 includes a vertically deflectable main member, center of the "S" shape, that is connected to a first side member 126, top of the "S" shape, and to a second side member 127, bottom of the "S" shape. A corner portion 128, one end of the "S" shape, of the first side member 126 is attached to the first support beam 135 and a corner portion 129, the other end of the "S" shape, of the second side member 127 is attached to the second support beam 130.

The load cell 100 also includes a top capacitive plate 105 that is disposed horizontally across and attached to the top surface of the first support beam 135 and the top surface of the second support beam 130. The top capacitive plate 105 is electrically isolated from the two support beams 135, 130. In this embodiment, the top capacitive plate 105 is a ridged printed circuit board. The top capacitive plate 105 has an opening 140 roughly in the center of the plate 105. In this embodiment, the opening 140 has a circular shape that allows a rod 143 having a smaller diameter than the opening 140 to pass through without contacting the top capacitive plate 105. The rod 143 passes through the opening 140 and contacts the surface 142 of the force responsive deflectable plate 125. The rod 143 transmits a force that is received by the force responsive deflectable plate 125 and causes the vertically deflectable main portion of the force responsive deflectable plate 125 to deflect downward a distance that is proportional to the force being applied. The force transmitted by the rod 143 is the force that is measured by the load cell 100.

The force responsive deflectable plate 125 is parallel to the top capacitive plate 105 and the bottom capacitive plate 115. The force responsive deflectable plate 125 is vertically offset to be closer to the top capacitive plate 105 than to the bottom capacitive plate 115. The force responsive deflectable plate 125 is always depressed in a downward direction or toward the bottom capacitive plate 115 so this configuration allows the force responsive deflectable plate 125 to be depressed a greater distance.

Figure 2A:
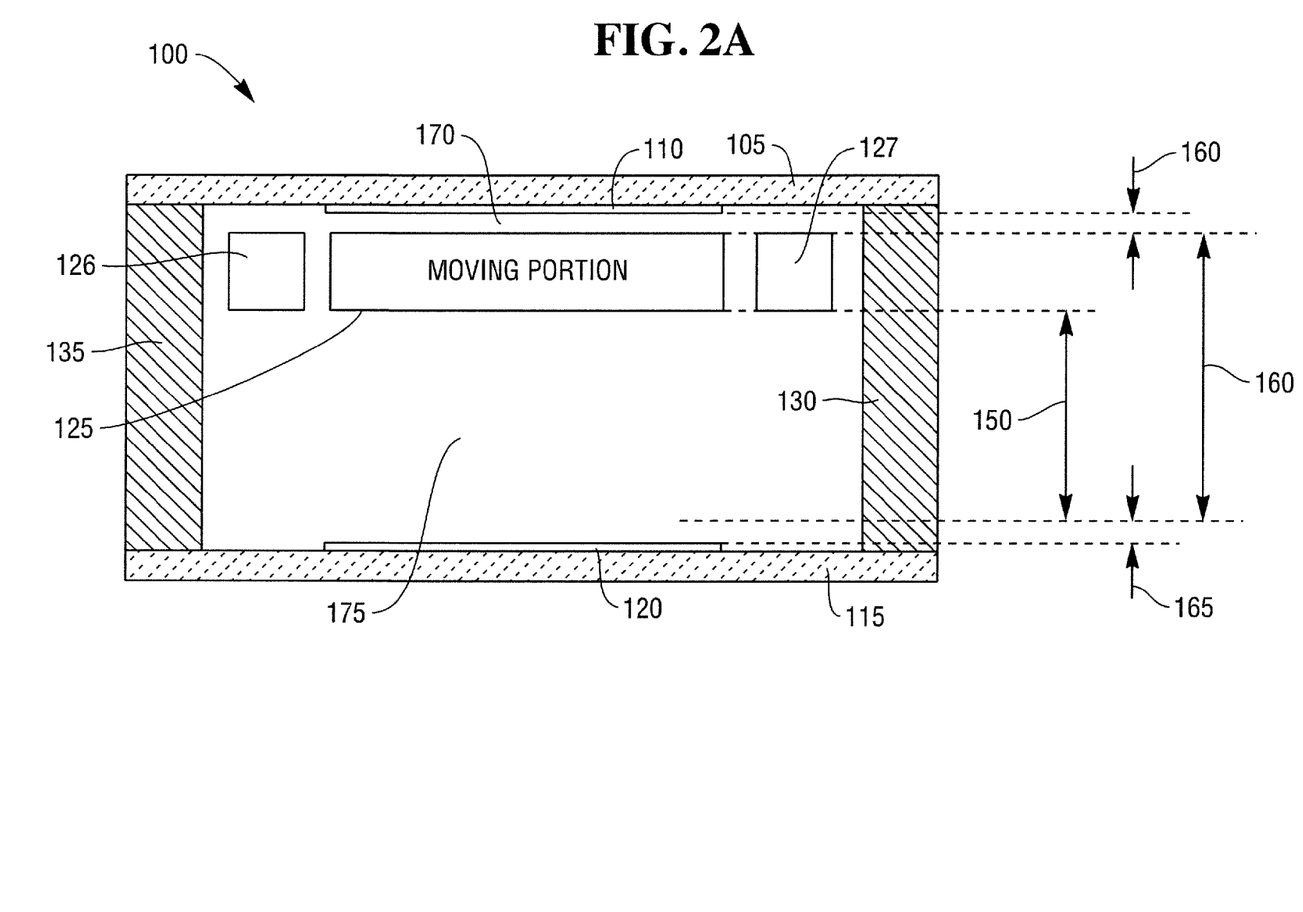
FIG. 2A is a high-level cross sectional drawing of the load cell where the force responsive deflectable plate is in the no load position.

The top capacitive plate 105 also includes a metal plate 110 (FIG. 2A) located on the bottom surface of the top capacitive plate 105 generally above the vertically deflectable main portion of the force responsive deflectable plate 125. In some embodiments, the metal plate 110 is located on an inner layer of the top capacitive plate 105. The metal plate 110 and the force responsive deflectable plate 125 together form a parallel-plate first capacitor 170 (FIG. 2A). Air is the dielectric material between the two plates 110, 125.

The bottom capacitive plate 115 includes a metal plate 120 (FIG. 2A) located on the top surface of the bottom capacitive plate 115 generally below the vertically deflectable main portion of the force responsive deflectable plate 125. In some embodiments, the metal plate 120 is located on an inner layer of the bottom capacitive plate 115. The metal plate 120 and the force responsive deflectable plate 125 together form a parallel-plate second capacitor 175 (FIG. 2A). Air is the dielectric material between the two plates 120, 125.

The vertically deflectable main portion of the force responsive deflectable plate 125 is a common plate between the first and second capacitors 170, 175. As the vertically deflectable main portion of the force responsive deflectable plate 125 moves downward in response to an applied force, the capacitance of the first capacitor 170 decreases while the capacitance of the second capacitor 175 increases. The change in the capacitance is dependent of the magnitude of the force being applied.

Figure 2B:
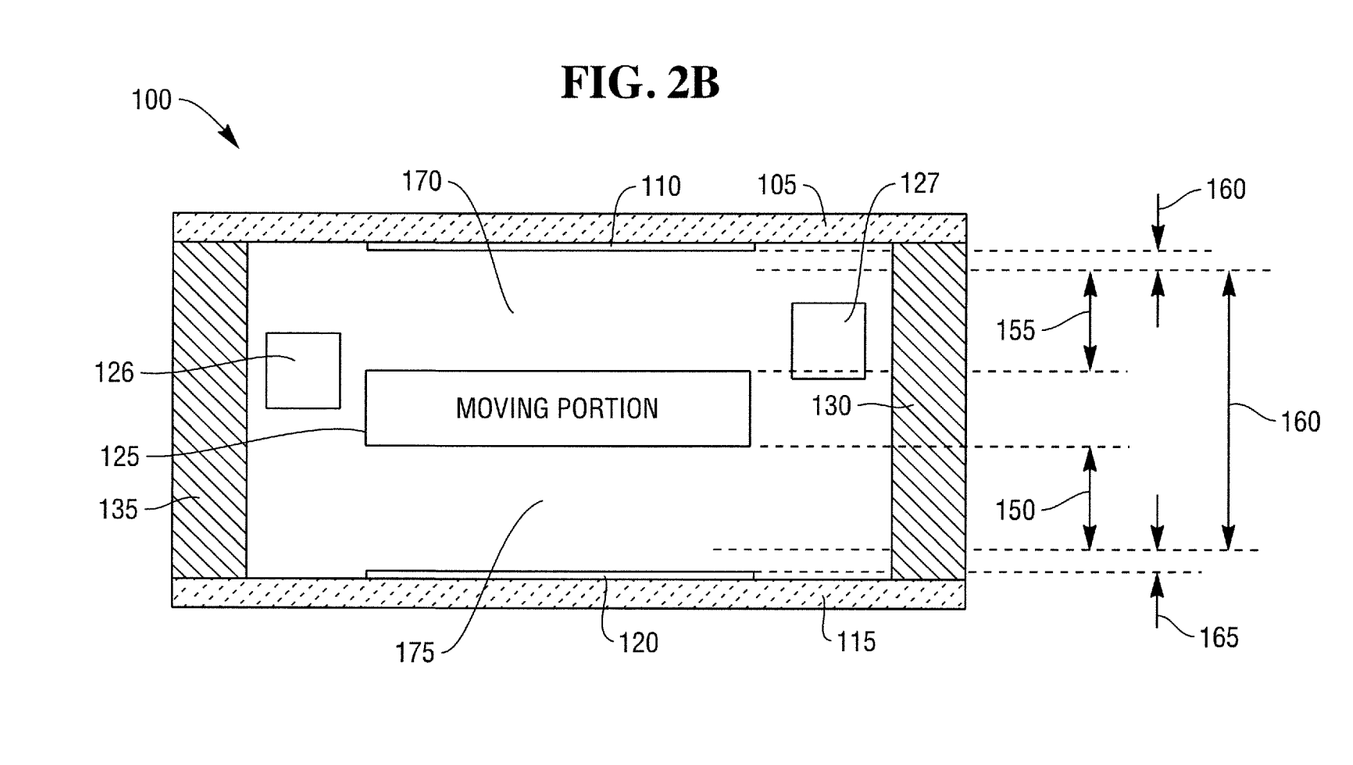
FIG. 2B is a high-level cross sectional drawing of the load cell where the force responsive deflectable plate is in the medium load position.
Figure 2C:
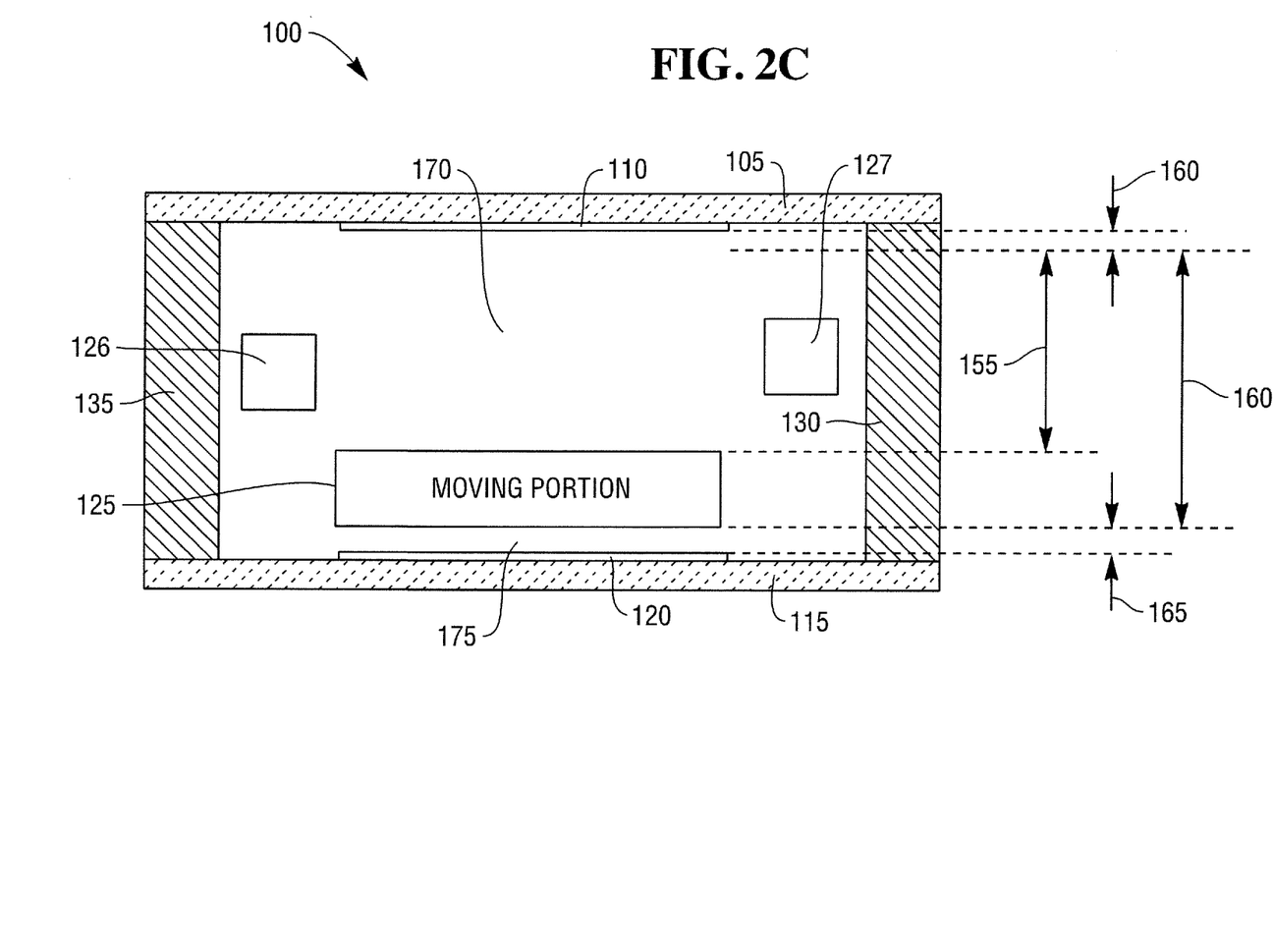
FIG. 2C is a high-level cross sectional drawing of the load cell where the force responsive deflectable plate is in the maximum load position.

FIGS. 2A, 2B and 2C show cross sections of the load cell 100 taken where plane 131 passes through the load cell 100.

Turning now to FIG. 2A, there is provided a high-level cross sectional drawing of the load cell 100 where the force responsive deflectable plate 125 is in the no load position. The load cell 100 and the force responsive deflectable plate 125 are shown in the no load configuration. In this configuration, no force is being applied to the force responsive deflectable plate 125. The force responsive deflectable plate 125 is attached to the first and second support beams 135, 130 at a location that is a minimum distance 160 from the bottom of the top capacitive plate 105. This minimum distance 160 along with the area of the metal plate 110 is used with formula 1 below to calculate the capacitance of the first capacitor 170.

In this position, the first capacitor 170 will have a capacitance that is higher than the second capacitor 175.

$$C = \epsilon_r \epsilon_0 (A/d) \quad \text{Formula 1}$$

where
C is the capacitance
A is the area of overlap of the two plates
$\epsilon_r$ is the dielectric constant of the material between the plates
$\epsilon_0$ is the electric constant ($8.854 \times 10^{-12}$ Fm$^{-1}$)
d is the separation between the plates When the force responsive deflectable plate 125 is in the no load position, the bottom metal plate 120 is at its maximum distance from the force responsive deflectable plate 125 as measured by a bottom distance 150. The bottom distance 150 is used with the formula 1 above to calculate the capacitance of the second capacitor 175. In this position, the second capacitor 175 will have the lowest capacitance.

As a force is applied to the force responsive deflectable plate 125, it can move through a distance 160 to a minimum distance 165 from the top surface of the bottom capacitive plate 115.

FIG. 2B provides a high-level cross sectional drawing of the load cell 100 where the force responsive deflectable plate 125 is in the medium load position. Under a medium load, the vertically deflectable main portion of the force responsive deflectable plate 125 is approximately halfway between the no load and maximum load positions. In this position, a top distance 155 and the bottom distance 150 are approximately the same. The first side portion 126 and the second side portion 127 have also been deflected down approximately halfway between the no load and medium load positions. The side portions 126, 127 only deflect approximately half as much because one end of each side portion 126, 127 is attached to one of the support beams 135, 130 and the other end of each side portion is connected to the main portion 125. As depicted in FIG. 2B, the first side portion 126 is slightly lower than the second side portion 127. This is because the cross section is offset from the middle of the load cell 100 and the side portions 126, 127 are attached to the support beams 135, 130 at opposite corners 128, 129.

FIG. 2C provides a high-level cross sectional drawing of the load cell 100 where the force responsive deflectable plate 125 is in the maximum load position. Under a maximum load, the vertically deflectable main portion of the force responsive deflectable plate 125 is approximately located at the maximum load position. In this position, the vertically deflectable main portion of the force responsive deflectable plate 125 is located at a minimum distance 165 from the upper surface of the bottom capacitive plate 115. This position represents the maximum force that can be accurately measured by the load cell 100. This position also represents the largest capacitance value for the second capacitor 175 and the lowest capacitance value for the first capacitor 170.

Figure 3:
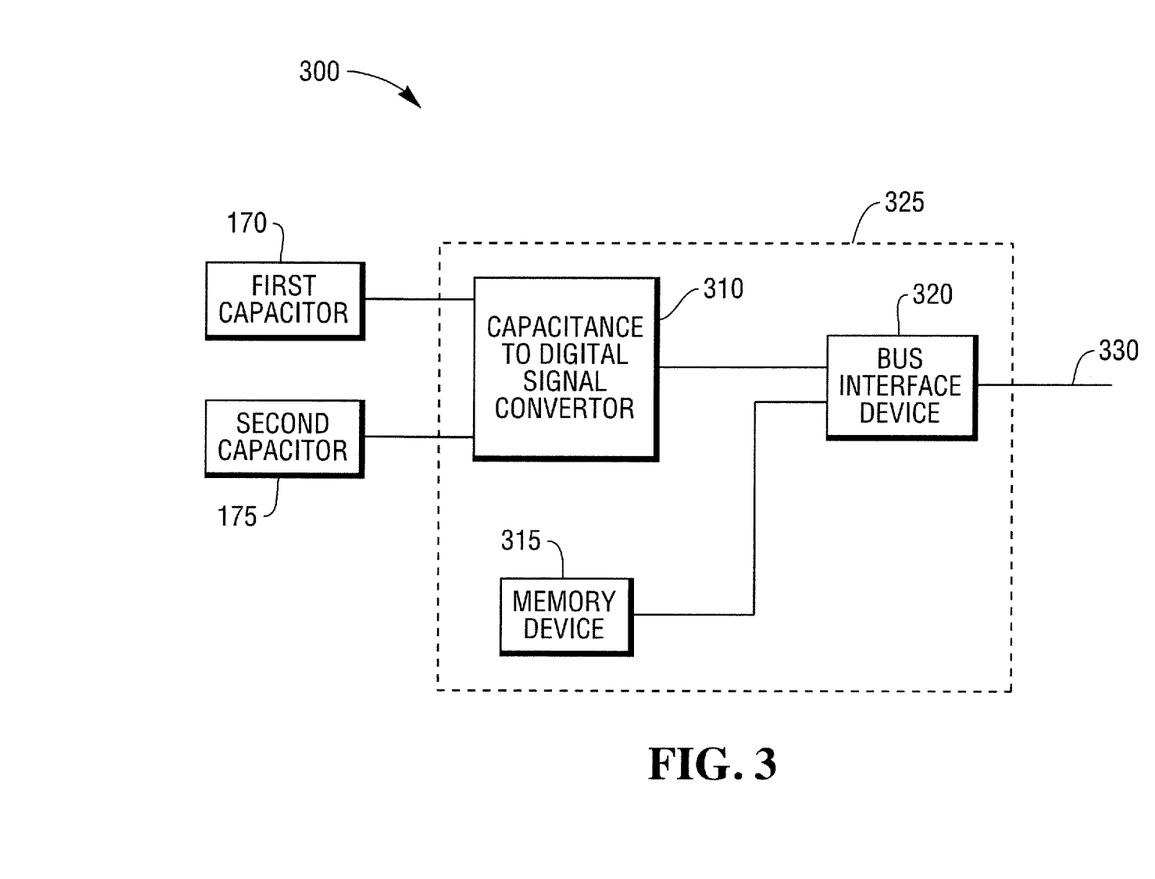
FIG. 3 is a high-level block diagram illustrating the electronic components of the load cell.

With reference to FIG. 3, there is provided a high-level block diagram illustrating the electronic components 300 of the load cell 100. The electronic components 300 include the first capacitor 170, the second capacitor 175, a capacitance to digital signal converter 310, a memory device 315 and bus interface device 320. The first capacitor 170 and the second capacitor 175 each have variable capacitances that are inversely related to each other. The capacitance of the capacitor 170, 175 varies as the vertically deflectable main portion of the force responsive deflectable plate 125 moves between the no load and the maximum load positions as an external force is applied to the main portion 125. The capacitance values for the first and second capacitor 170, 175 are used to determine the value of the applied force. The capacitance to digital signal converter 310 has a first and second channel. Each channel measures the capacitance of one of the two capacitors 170, 175 and converts the analog measurement to a digital signal that represents the capacitance of the measured capacitance. A commercially available example of the dual channel capacitance to digital signal convertor 310 is the AD7747 device produced by Analog Devices. It can measure up to an 8 pF change in capacitance per channel and is designed to measure the differential capacitance between the first and second capacitors 170, 175. In some embodiments, the load cell 100 outputs the differential capacitance between the first and second capacitors 170, 175.

The bus interface device 320 generates an external bus 330 that an external device uses to communicate with the load cell 100. The bus interface device 320 also interfaces with the capacitance to digital signal convertor 310 and the memory device 315 to allow an external device to communicate with each of the devices. Using the bus interface device 320, the external device can read the capacitance values for the first and second capacitors 170, 175 from the capacitance to digital signal convertor 310 and can read or write data to the memory device 315. In some embodiments, the external device using the bus interface device 320 can read a differential capacitance value for the first and second capacitors 170, 175 from the capacitance to digital signal convertor 310. The bus interface device 320 can support a number of different external buses 330, such as a universal serial bus (USB), RS-232, RS-485, an LIN-bus, an CAN-bus, an I$^2$C bus and the like.

The memory device 315 stores calibration data or information that is required to calculate the weight being measured by the load cell 100. An external device with a processing element reads the capacitance values for the two capacitors 170, 175 and the calibration data and processes the data to determine the weight being applied to the load cell 100. In some implementations, multiple load cells 100 are required in a single weigh scale and the external device would read data from each of the load cells 100 to calculate the total weight of an item being weighed. An external device may also write data to the memory device 315. This allows the calibration data to be updated if required.

In some embodiments, the capacitance to digital signal convertor 310 takes the difference of the capacitance values from the two capacitors 170, 175 and only outputs the difference value. Table 1 below illustrates the inverse relationship between the capacitance values for the first and second capacitors 170, 175 and the difference value that is calculated. The capacitance values are presented for example only and should not be inferred to be required values.

TABLE 1

| First Capacitor | Second Capacitor | Difference Value | Position |
|---|---|---|---|
| 8 pF | 1 pF | 7 pF | No Load |
| 7 pF | 2 pF | 5 pF | |
| 6 pF | 3 pF | 3 pF | |
| 5 pF | 4 pF | 1 pF | |
| 4 pF | 5 pF | −1 pF | Medium Load |
| 3 pF | 6 pF | −3 pF | |
| 2 pF | 7 pF | −5 pF | |
| 1 pF | 8 pF | −7 pF | Maximum Load |

In the present embodiment, the capacitance to digital signal convertor 310, the memory device 315 and bus interface device 320, are separate electronic components and are mounted on the top surface of the top capacitive plate 105 which is a ridged printed circuit board (PCB). The top capacitive plate 105 also has an electrical connection to the metal plate 110 on the bottom surface of the top capacitive plate 105, an electrical connection to the force responsive deflectable plate 125 and an electrical connection to the metal plate 120 on the top surface of the bottom capacitive plate 115. In some embodiments, the capacitance to digital signal convertor 310, the memory device 315 and bus interface device 320 are integrated into a single electronic component 325.

Figure 4:
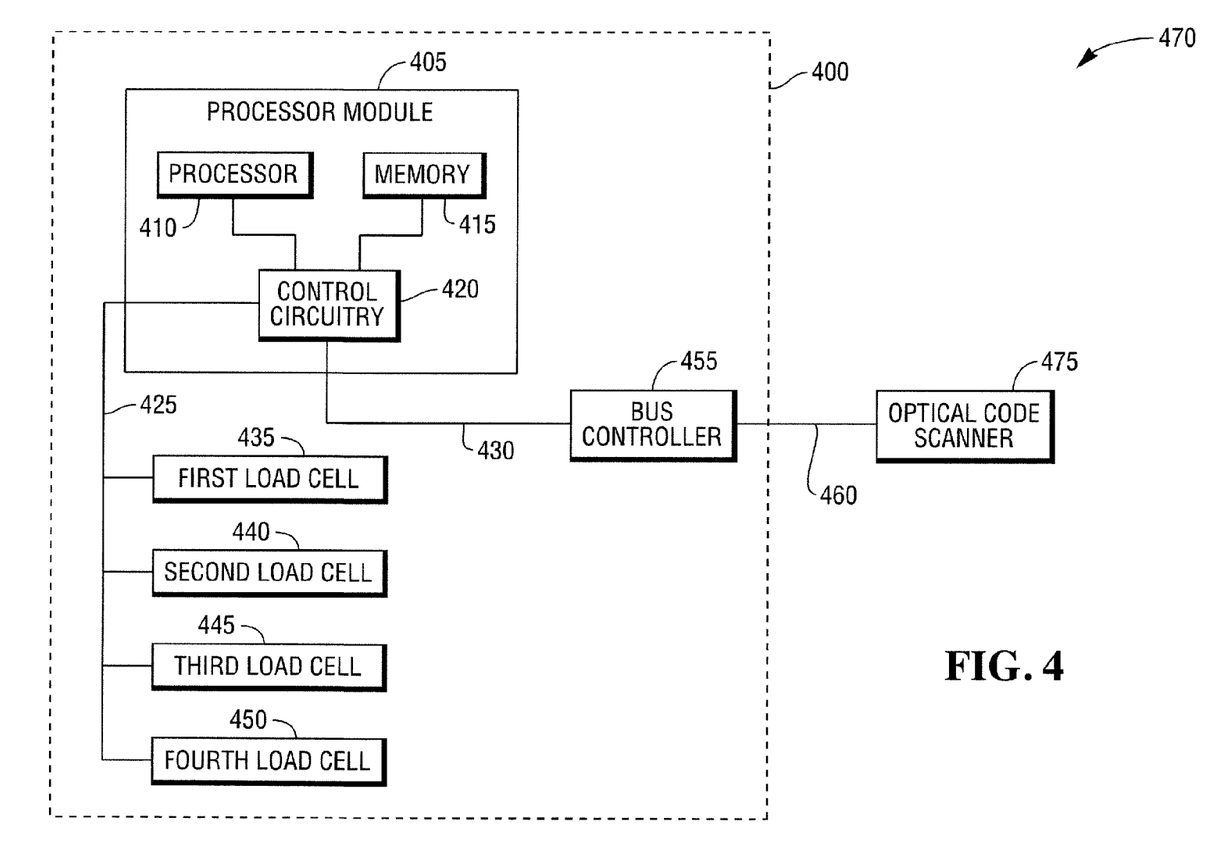
FIG. 4 is a high-level block diagram illustrating an exemplar embodiment of certain hardware components of an optical code scanner/weigh scale.

With reference to FIG. 4, there is provided a high-level block diagram illustrating an exemplar embodiment of certain hardware components of an optical code scanner/weigh scale 470. The optical code scanner/weigh scale 470 includes an optical code scanner 475 and a weigh scale 400. The scale 400 includes a processor module 405 which includes a processor 410, a memory 415, and control circuitry 420. The memory 415 is non-transitory and computer readable. The memory 415 includes both volatile and non-volatile memory. The non-volatile memory may suitably include solid state and rotating memory devices. The processor 410 executes software stored in the memory 415 which causes the processor 410 to control the components of the scale 400 and to implement the features and functions of the scale 400.

Additionally, the scale 400 includes a first load cell 435, a second load cell 440, a third load cell 445 and a fourth load cell 450. Each of the load cells 435, 440, 445, 450 are formed following the teachings above with respect to the dual capacitor load cell 100.

The control circuitry 420 includes hardware interfaces between the processor 410 and the memory 415, between the processor 410 and a bus 425 used to communicate with each of the four load cells 435, 440, 445, 450 and between the processor 410 and a bus controller 455. The bus 425 may suitably include a universal serial bus (USB), RS-232, RS-485, an LIN-bus, an CAN-bus, an I²C bus and the like. In some embodiments, bus 425 includes 4 separate buses where a bus is assigned to one of the four load cells 435, 440, 445, 450. Each load cell 435, 440, 445, 450 is accessed independently.

Figure 5:
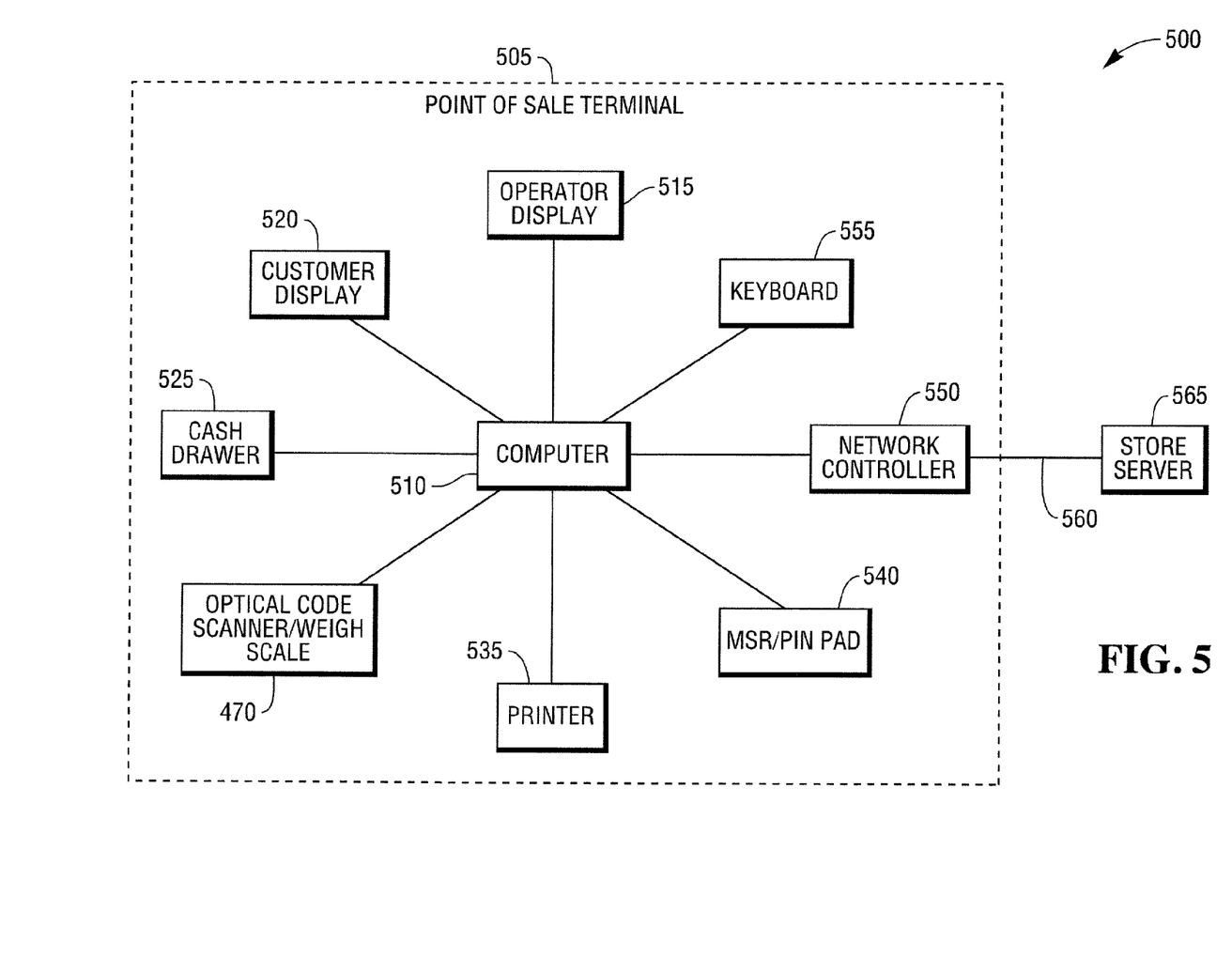
FIG. 5 is a high-level block diagram illustrating a point of sale system including a point of sale terminal that uses a network to communicate with a store server computer.

The bus controller 455 includes the hardware and software required for the scale 400 to connect to and communicate over the network connection 460 to the optical code scanner 475 that is part of a point of sale terminal 505 (FIG. 5). In some embodiments, the network connection 460 is implemented as a universal system bus (USB). In other embodiments, the network connection 460 is implemented as an RS-232 interface. In some embodiments, the network connection 460 is implemented as a wireless network, such as the Bluetooth™ wireless network or the like.

The scale 400 includes a weigh plate where items are placed to be weighed. The weigh plate is supported at its corners by one of the four load cells 435, 440, 445, 450. The weigh plate is isolated from other structures of the scale 400. The weigh plate has a certain weight that must be determined as part of performing a zeroing function for the scale 400. The processor 410 determines the zero weight by reading capacitance values and calibration data from each of the four load cells 435, 440, 445, 450 when nothing is present on the weigh scale. Using the capacitance values and calibration data, the processor calculates the force being applied to each of the four load cells 435, 440, 445, 450 and then adds the four values to determine a value for total zero weight of the scale 400. This value is stored in the memory 415. When an item is placed on the weigh plate, the processor 410 repeats the above process which produces a weight that includes the weight of the item plus the zero weight for the scale 400. The processor 410 reads the zero weight value stored in the memory 415 and subtracts it from the total weight to determine just the weight of the item.

Turning now to FIG. 5, there is provided a high-level block diagram illustrating a point of sale system 500 including a point of sale (POS) terminal 505 that uses a network 560 to communicate with a store server computer 565. The point of sale system 500 may suitably include more than one POS terminal 505 where each POS terminal 505 communicates over the network 560 with the store server computer 565. The POS terminal 505 may be implemented as either an assisted or a customer operated POS terminal.

In this embodiment, the POS terminal 505 includes a computer 510 and a number of components and peripherals that are controlled by the computer 510. The POS terminal 505 further includes an operator display 515, a customer display 520, a cash drawer 525, the optical code scanner/weigh scale 470, a printer 535, a magnetic stripe reader (MSR) and personal identification number (PIN) pad 540, a network controller 550 and a keyboard 555.

The operator display 515 displays information used by a cashier to operate the POS terminal 505. In this embodiment, the cashier is a trained operator employed to, at least in part, operate the POS terminal 505. The keyboard 555 is used by the cashier to input data and commands to the computer 510. The cash drawer 525 is controlled by the computer 510 and stores currency, checks, coupons and the like. In some embodiments, the cash drawer 525 is replaced by an automatic cash acceptor/dispenser which is controlled by the computer 510 and accepts and dispenses currency. The optical code scanner/weigh scale ("scanner") 470 is used to read optical codes presented to the POS terminal 505 for identification and to weigh items placed on the weigh scale 400. The weigh scale 400 determines the weight of an item placed on the weigh plate. The customer display 520 is visible to the customer and used to display information about the transaction to the customer.

The network controller 550 has hardware and software necessary to support a connection to the local area network 560 and for the computer 510 to communicate over the local area network 560 to the store server 565 or other computers and POS terminals on the network 560 or to computers on other networks connected to the local area network 560. In some embodiments, the network controller 550 supports a transmission control protocol/internet protocol (TCP/IP) network protocol and the local area network 560 is an Ethernet network.

The MSR/PIN PAD 540 reads information from a magnetic stripe usually attached to the back of a card, such as a credit/debit card, loyalty card or the like. The PIN pad portion 540 is used to enter PIN numbers associated with a credit or debit card. The MSR/PIN Pad 540 device also includes software and hardware to communicate with an external server used to process credit transactions. The printer 535 is used to print customer receipts and other documents.

The store server 565 includes software and data used to process purchase transactions being performed at the POS terminal 505. The data includes a product lookup database that is used to identify items presented to the POS terminal 105 for purchase. When an optical code is scanned by the POS terminal 505, information read from the optical code is sent to the store server 565 and used to identify a data record in the product lookup database. The data record includes information about the item the optical code is attached to including a price and description of the item. This information is returned back to the POS terminal 505 and is used to process a purchase transaction. The store server 565 also maintains information on all purchase transactions performed by the POS terminal 505 and can either process payment requests or contact external computer servers that will process the payment requests.

Figure 6A:
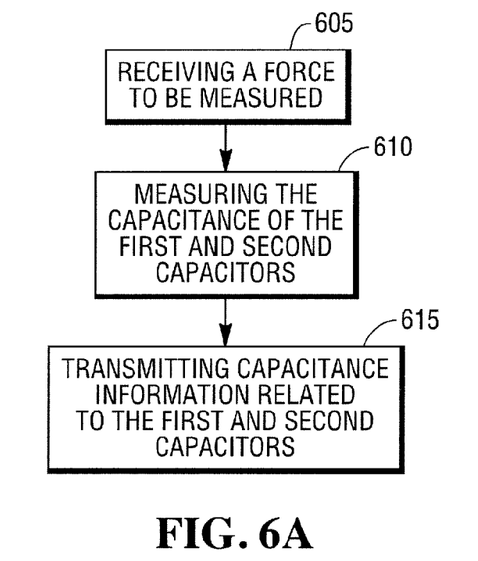
FIG. 6A is a high-level flow diagram illustrating the measurement of a force applied to the load cell.
Figure 6B:
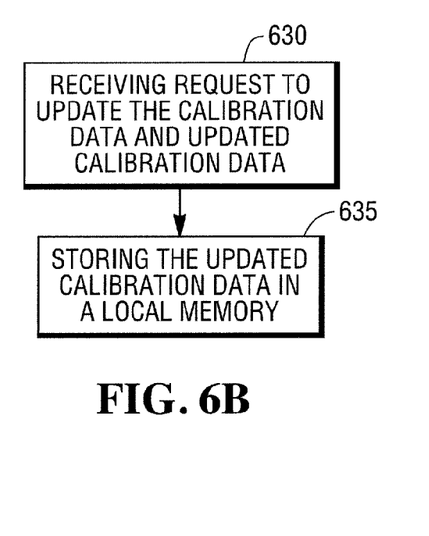
FIG. 6B is a high-level flow diagram illustrating the updating of calibration data stored in the memory of the load cell.
Figure 6C:
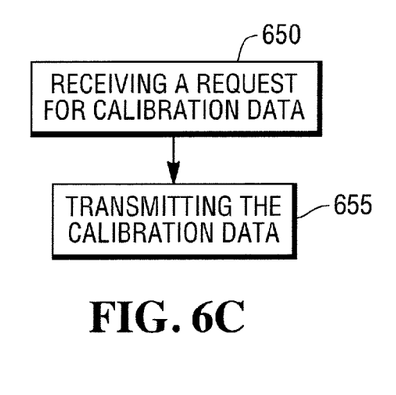
FIG. 6C is a high-level flow diagram illustrating the requesting of calibration data stored in the memory of the load cell.

With reference to FIGS. 6A, 6B, 6C, there are provided a high-level flow diagram illustrating methods of operating the load cell 100. These methods describe one embodiment of the load cell 100 and example methods for operating it.

FIG. 6A is a high-level flow diagram illustrating the measurement of a force applied to the load cell 100. In step 605, the load cell 100 receives a force that acts against the vertically deflectable main portion of the force responsive deflectable plate 125 and causes it to move downward a distance that is proportional to the applied force. The force is mechanically applied to the vertically deflectable main portion of the force responsive deflectable plate 125.

In step 610, the capacitance to digital signal convertor 310 measures the analog capacitance of the first and second capacitors 170, 175, processes the analog data and produces a digital value for each measurement. In some embodiments, the capacitance to digital signal convertor 310 also subtracts the resulting digital values to produce one digital value for the first and second capacitors 170, 175.

In step 615, the bus interface device 320 reads the digital values from the capacitance to digital signal convertor 310 and transmits the capacitance data on the external bus 330. In some embodiments, the bus interface device 320 receives a request from the external bus 330 to transmit the current capacitance data from the capacitance to digital signal convertor 310. In other embodiments, the bus interface device 320 periodically transmits the current capacitance data on the external bus 330. For example, the bus interface device 320 may transmit the current capacitance data every 100 milliseconds. The time period may also be selectable.

FIG. 6B is a high-level flow diagram illustrating the updating of calibration data stored in the memory 315 of the load cell 100. In step 630, the bus interface device 320 receives over the external bus 330 a request to update the calibration data and receives updated calibration data.

In step 635, the bus interface device 320 stores the updated calibration data in the memory 315 on the load cell 100.

FIG. 6C is a high-level flow diagram illustrating the requesting of calibration data stored in the memory 315 of the load cell 100. In step 650, the bus interface device 320 receives over the external bus 330 a request to transmit the calibration data over the external bus 330.

In step 655, the bus interface device 320 reads the calibration data from the memory 315 and transmits it over the external bus 330.

Although the present invention has been described with particular reference to certain preferred embodiments thereof, variations and modifications of the present invention can be effected within the spirit and scope of the following claims.

What is claimed is:

1. A capacitive based sensor for measuring a received force comprising:
a first support beam and a second support beam where the first and the second support beams are horizontally spaced apart and generally parallel;
a top capacitive plate disposed horizontally across and attached to the first support beam and the second support beam;
a generally S-shaped force responsive deflectable plate including a vertically deflectable main portion attached to a first side portion and a second side portion, the first side portion attached to the first support beam, the second side portion attached to the second support beam, the main portion being resiliently connected to the first and the second support beams such that the main portion is configured to move vertically in response to the received force and where the force responsive deflectable plate is located below the top capacitive plate;
a bottom capacitive plate disposed horizontally between and attached to the first support beam and the second support beam and located below the force responsive deflectable plate; and
where the top capacitive plate and the force responsive deflectable plate form a first capacitor, and the bottom capacitive plate and the force responsive deflectable plate form a second capacitor, and the capacitance of the first capacitor and the second capacitor change inversely as the result of movement of the force responsive deflectable plate.

2. The sensor of claim 1, further comprising:
a capacitance to digital converter adapted to measure and output the deferential capacitance between the first capacitor and the second capacitor.

3. The sensor of claim 1, further comprising:
a memory including calibration settings stored therein.

4. The sensor of claim 1, further comprising:
an external bus controller adapted to communicate with external devices.

5. The sensor of claim 1, wherein the top capacitive plate includes an opening located generally in the center of the capacitive plate and configured to allow the mechanical transmission of the received force without contact with the top capacitive plate to the main portion of the force responsive deflectable plate.

6. The sensor of claim 1, wherein the main portion of the force responsive deflectable plate is configured to move between a no load position and a maximum load position in response to the received force.

7. The sensor of claim 6, wherein the position of the main portion is proportional to the magnitude of the received force.

8. The sensor of claim 6, wherein the capacitance of the first capacitor decreases as the main portion of the force responsive deflectable plate moves from the no load position to the maximum load position.

9. The sensor of claim 6, wherein the capacitance of the second capacitor increases as the main portion of the force responsive deflectable plate moves from the no load position to the maximum load position.

* * * * *